March 11, 1941.   F. E. ALTMAN ET AL   2,234,717
PHOTO COPYING MACHINE
Filed March 22, 1939

FREDERICK A. TOMPKINS
FRED E. ALTMAN
INVENTORS

BY
ATTORNEY
AGENT

Patented Mar. 11, 1941

2,234,717

UNITED STATES PATENT OFFICE 2,234,717

PHOTO COPYING MACHINE

Fred E. Altman and Frederick A. Tompkins, Rochester, N. Y., assignors to Eastman Kodak Company, Rochester, N. Y., a corporation of New Jersey Application March 22, 1939, Serial No. 263,424

7 Claims. (Cl. 88—24)

This invention relates to photographic apparatus and particularly to direct photo copying machines of the type including a reflector in the optical system.

It is the object of this invention to provide an inexpensive, compact and sturdy photo copying machine which can be operated by even the most inexperienced office clerks.

It is a particular object of one embodiment of the invention to provide a photo copying machine which makes unit magnification positive or negative copies of flexible sheet originals and in which the originals may be photographed and sent to their proper destination without delay and the record thereof processed at any convenient later time.

According to the invention, these objects are accomplished by employing a continuous feed mechanism to move the original, which is to be copied, past an exposure gate and another continuous feed mechanism synchronized therewith to move photo-sensitive sheet material such as ordinary photographic paper or direct positive paper past an image plane. The compactness and other advantages of the invention are provided by having this exposure gate and image plane adjacent to each other and by having a focusing reflector arranged to focus the light from the exposure gate onto the image plane. The feed mechanisms comprise two elongated parallel rollers over which the original and the photosensitive paper are accurately guided and which are geared to move together and in opposite directions so that the image of the original as projected onto the photosensitive paper moves in synchronism with the paper thus eliminating any blurring or distortion of the image. The gearing of the two rollers may be provided by any suitable means, but preferably by a direct spur gear train.

Figure 1:
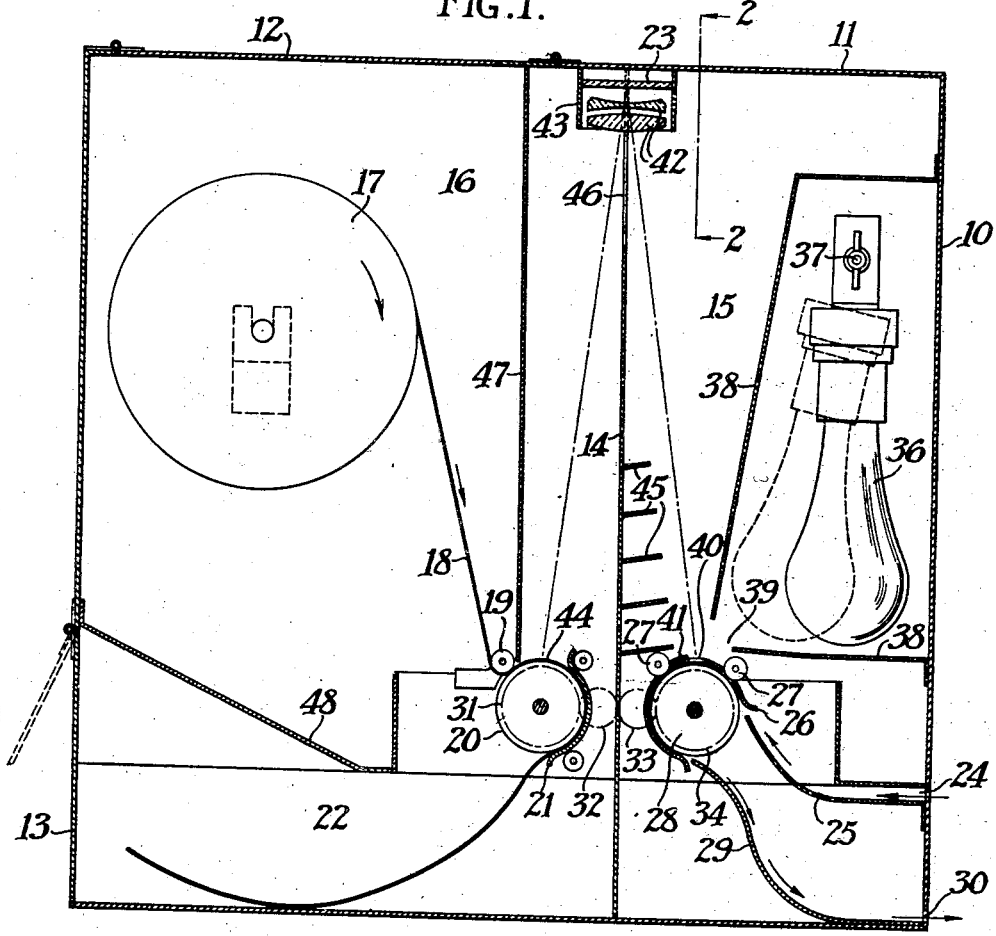
Figure 2:
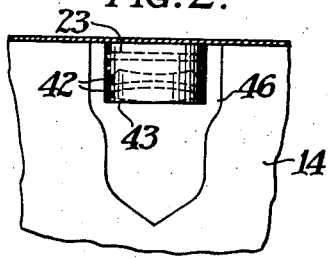
Figure 3:
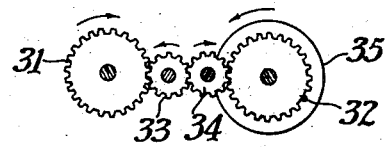

To the end that the invention may be fully understood, a preferred embodiment is illustrated in the accompanying drawing, in which:

Fig. 1 is a vertical sectional elevation of a photo copying machine embodying the invention, Fig. 2 is a fragmentary section on line 2—2 of Fig. 1 showing a detail; and Fig. 3 is a detail, in elevation, to show the driving connections between the feed rolls.

According to the invention, a copying machine is made up of a casing 10, having suitable access doors 11, 12, 13, and with a partition 14 extending from the top of the casing to the bottom thereof. The casing 10 is thus divided into two compartments, the one designated as 15 being a "copy" compartment and the other 16, being a "paper" or reproduction compartment.

In compartment 16 a sensitive "paper" strip 18 is fed from a supply roll 17, under an idler 19, over a driven roll 20 and under a guide 21 that serves to maintain feeding contact between the paper and the roll 20, the whole constituting part of a paper-feeding mechanism. The paper after leaving the guide 21 may be cut off in a dark chamber 22 or may be fed directly to a processing tank or machine in any well known manner.

A letter, a document or any flexible sheet original to be copied is fed into the machine at an opening 24 and along a guide plate 25, whence it passes under a guide 26 and pressure rolls 27, and is thereby held in feeding contact with a driven feed roll 28. After passing partly around the latter the copy slides down a guide plate 29 and issues at 30 on the same side of the casing 10 into which it was fed.

The shafts of rolls 20 and 28 are connected, as by gears 31 and 32 respectively on their outer ends, and idler pinions 33 and 34 between said gears. One of the gears 31 or 32 carries a driven pulley 35, which, if rotating as shown in Fig. 3 will cause the rolls 28 and 20 to rotate in opposite directions as indicated, and at equal speeds. Obviously any suitable direct coupling means may be used and if a simple spur gear train is used, as shown, it must contain an even number of spur gears.

The original passing over roll 28 is suitably illuminated, for example by a row of lamps 36 in the copy compartment 15, which lamps may be swung as indicated in broken lines to various positions about a pivot 37 to vary the intensity of illumination. The lamps 36 are almost entirely enclosed by a housing 38, except for an opening 39 therein, through which light from the lamps strikes the original passing over the roll 28, an aperture 40 in gate 26 being provided to limit the illuminated area. The aperture 40 may be increased or decreased in area circumferentially of the roll 28 by a slide or adjustable closure plate 41.

To reduce the illumination of the original when "faster" photographic paper is being used, a variable resistance, not shown, may be interposed in the lamp circuit and adjusted in any well known manner to suit the paper. So-called "bromide" paper, for instance, is much faster than "direct-positive" paper and therefore permits of a greatly reduced light intensity or a faster feeding speed of the original copy and the sensitive paper.

At the top of casing 10, and centrally on the partition 14, is a focusing reflector, adapted to receive light reflected from the original, and project an image of the latter to the photo-sensitive paper. This focusing reflector may be any one of several optical combinations or even merely a suitable concave reflector. In the preferred form of the invention illustrated herewith it is a plane reflector 23 and one half 42 of a symmetrical lens, mounted in a tubular cell 43. This lens may be of the Graf type or of any suitable design in which identical front and rear components would be employed if the lens were to be used in straight photography. However, in the present invention, the light from the original at the gate aperture 40 passes through the "half-lens" which consists of the element 42 and is then reflected from the front-surfaced mirror 23, and thence back through the lens element. The angle between the optical axis of the lens and the path of the light reaching the lens from the original is such that the light reflected from mirror 23 issues through the lens and enters the paper compartment of the machine, where it is focused at unit magnification on the image plane 44, that is, on the photosensitive paper 18. The original and the paper move at the same linear speed (the rolls 28 and 20 preferably but not necessarily being equal in diameter) and thus as the original passes the aperture 40 the image thereof moves synchronously with the paper 18 and the projected image when developed will be sharp and clear, without blur or distortion. Furthermore, this optical arrangement accomplishes the lateral inversion which all direct-copying machines require. Obviously the focusing reflector 43 is spaced from each of the rolls a distance substantially equal to twice its focal length in order to give one to one magnification.

It will be noted that in the present design the path of projection is restricted to a small casing by the use of the optical system and reflector illustrated, resulting in a compact and sturdy unit.

Baffles 45 extending into compartment 15 from partition 14 prevent specular reflection or scattering of the rays emanating from the copy so that "ghost" images will not strike the focusing reflector 42. As shown in Fig. 2, the partition 14 is built up to the top of the casing 10 in a direction normal to an axial plane common to rolls 20 and 28, only a small area 46 around the lens mount 43 being open to permit light which reaches the lens from one compartment to be reflected to the other compartment. A second partition 47 confines the light to the exposure area on roll 20 and prevents fogging of the paper strip 18. Another wall 48 also protects the paper when door 13 is opened.

Having thus described the preferred embodiment of our invention, we wish to point out that it is not limited to the specific structure shown but is of the scope of the following claims.

We claim:

1. A photo copying machine having a casing divided into two compartments, means consisting of an elongated drum in one compartment for feeding a copy to be photographed, means consisting of a second elongated drum substantially coextensive with the copy feeding drum in the other compartment for feeding photo-sensitive sheet material, said drums being parallel and positioned in their respective compartments adjacent to one another, means coupling the two feeding means to move the copy and photo sensitive material in opposite directions at equal speeds, a slotted member positioned transversely to the copy feeding means to frame a portion of the copy, a light source for illuminating said portion of the copy, a focusing reflector positioned at twice its focal length from said portion of the copy and to receive light therefrom, to reflect it into the photo sensitive material compartment and to focus it to an image therein, said photo sensitive material feeding means being positioned to feed the material through the plane of said image, and a second slotted member framing that portion of the photo sensitive material receiving said image.

2. A photo copying machine having a casing and a partition therein dividing said casing into two compartments, a copy-feeding roll in one of said compartments and a sensitized-material feeding roll in the other of said compartments, said rolls being of the same diameter, substantially coextensive in length, parallel, adjacent to one another, and having driving connections for rotating them at equal speeds in opposite directions, a light source for illuminating the copy-feeding roll, a focusing reflector including a lens, said reflector being positioned with its optical axis normal to a common axial plane of the two rolls and equidistant from both rolls at a distance from each roll equal to twice the focal length of said focusing reflector so that light received by said reflector from the copy-feeding roll is projected to a focal plane on the sensitized-material feeding roll.

3. A photo copying machine having a casing, a feeding device including a pair of parallel coextensive and adjacent rolls geared together to rotate in opposite directions at equal peripheral speeds, feeding guides for sheet material associated with and over each of said rolls, each of said feeding guides having an opening therein, a light source adjacent to the opening over one of said rolls, a focusing reflector having its optical axis aligned with said partition, said reflector being positioned to receive light reflected from sheet material passing the opening adjacent to the light source and to project said light to a focal plane at the opening over the other of said rolls and baffle means for preventing light other than said projected light from entering said opening over the other of said rolls.

4. A photo copying machine having a casing, a copy-feeding roll and a photo sensitive material feeding roll in said casing, said rolls being parallel, adjacent to one another and co-extensive, means for rotating said rolls in opposite directions at equal peripheral speeds, a partition in said casing disposed between said rolls normal to a common axial plane of the latter, said partition having an opening therethrough spaced from said common plane, a focusing reflector in said opening, and a light source so arranged that light therefrom may impinge on said copy-feeding roll and be reflected to the focusing reflector, said reflector being arranged to direct and focus said light onto the photo sensitive material feeding roll.

5. A photo copying machine having two driven rolls which are parallel, adjacent, substantially coextensive in length and provided with exposure gates, said rolls being adapted, respectively, to feed a copy and photo sensitive material at equal speeds in opposite directions through said gates, a light source positioned to illuminate copy passing through the copy gate, a focusing reflector including a lens positioned to receive light reflected from the copy and to focus it to an image at the other of said gates, and a casing including partitions arranged to prevent light other than that in said image from impinging on the photo sensitive material.

6. A photo copying machine according to claim 4 wherein the two parallel rolls are of equal diameter and the optic axis of the focusing reflector is perpendicular to the plane common to the axes of the two rolls.

7. A photo copying machine according to claim 4 wherein said rotating means include a gear train having an even number of spur gears coupling the two rolls.

FREDERICK A. TOMPKINS.
FRED E. ALTMAN.